June 28, 1960  A. M. STOTT  2,942,911
PARACHUTE DISCONNECT COUPLING
Filed May 2, 1957
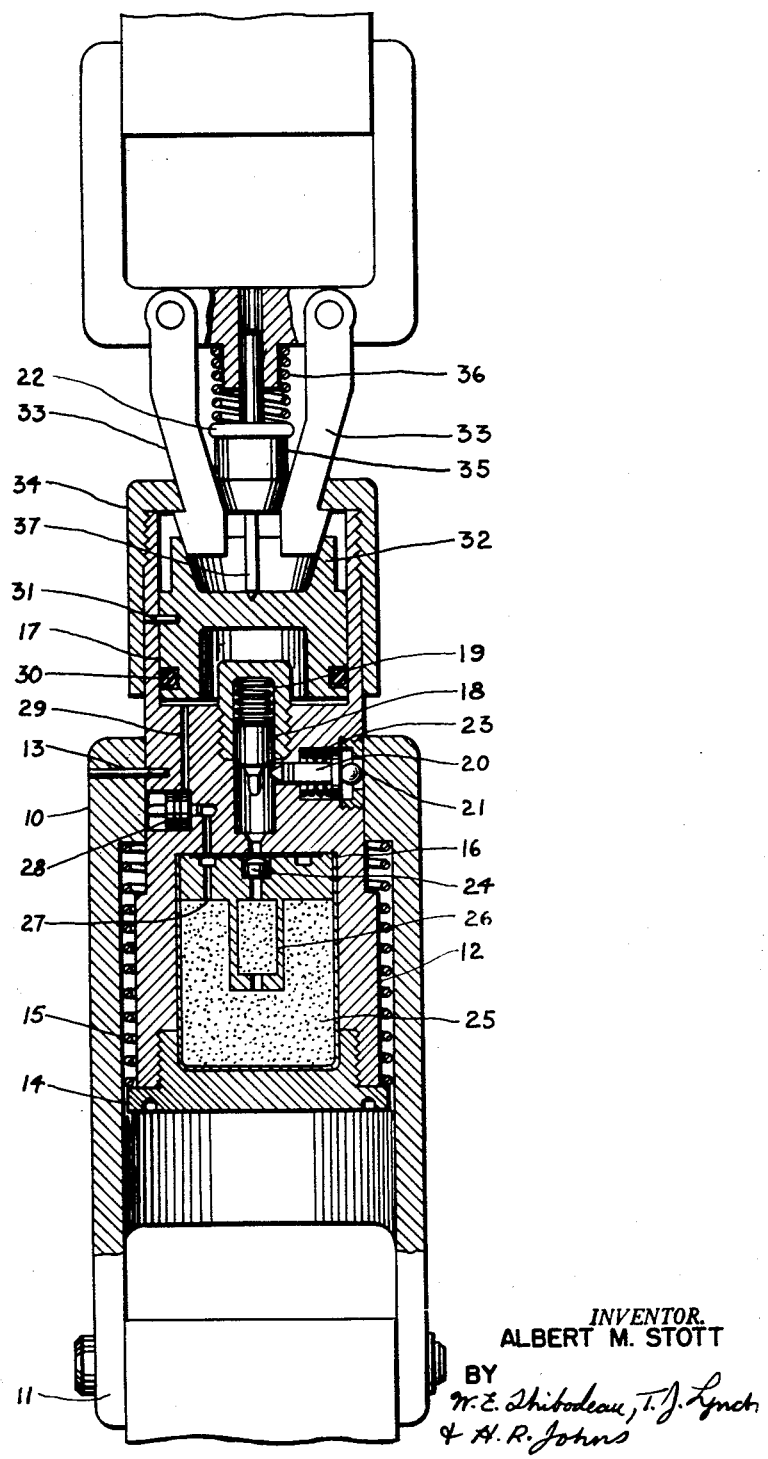
INVENTOR.
ALBERT M. STOTT

United States Patent Office 2,942,911
Patented June 28, 1960

2,942,911
PARACHUTE DISCONNECT COUPLING
Albert M. Stott, 23 Albert Ave.,
Aldan-Clifton Heights, Pa.
Filed May 2, 1957, Ser. No. 656,734
6 Claims. (Cl. 294—83)
(Granted under Title 35, U.S. Code (1952), sec. 266)

The invention described herein may be manufactured and used by or for the Government for governmental purposes without the payment of any royalty thereon.

This invention relates to devices for disconnecting a parachute from its load. More particularly it relates to an improved decoupling device which is distinguished from similar prior art devices by its simplicity of construction and its improved mode of operation.

Insofar as applicant is aware, all these prior art devices involve the use of more or less complicated mechanisms or are not altogether controlled by a tension between the parachute and its load. Thus in the case of the disconnecting device of U.S. Patent No. 2,625,423, granted to J. L. Hight on January 13, 1953, a somewhat complicated system of levers are initially locked together for supporting the load and are unlocked by the firing of a cartridge which is activated by a line between the airplane and the descending load. The present invention involves two cooperating parts which function to produce a gas under pressure in response to the shock produced by opening of the parachute and function to vent this gas for disconnecting the parachute in response to decrease in the pull of the load.

The invention will be better understood from the following description considered in connection with the accompanying drawings and its scope is indicated by the appended claims.

The single figure of the drawing illustrates a cartridge actuated parachute disconnect coupling which includes a housing 10 having at one means 11 for attaching it to a load to be dropped from an airplane with the aid of a parachute attached at the end opposite to the load.

Extending into the upper end of the housing 10 is a telescopic member 12 which is fixed to the housing 10 by a rupturable coupling or shear pin 13. Interposed between an inner shoulder of the housing 10 and an outwardly extending part of the end member 14 of the housing 12 is a spring 15 between the opposed flanges illustrated.

The member 12 encloses a cartridge firing chamber which contains an explosive cartridge 16 and a piston 17 which operates the locking mechanism by which the disconnect coupling is attached to the parachute.

Between the piston 17 and the cartridge firing chamber is a firing pin 18 which is held against a compressed spring 19 by a sear pin 20. So long as the housing 10 and the member 12 are in the fixed relation established by the shear pin 13, the pin 20 is maintained in its illustrated position by a ball 21. When the housing 10 moves in response to the shock produced by opening of the parachute, however after rupture of shear pin 13, a spring 23 functions to eject the ball 21, and release the pin 20 so that the firing pin 18 is impacted against the primer 24 of the cartridge.

In addition to the primer 24, the cartridge is shown as including a charge 25 and a delay element 26 which is used only in case a time delay between the firing of the cartridge 16 and the generation of the gaseous pressure is desired. Such a delay is sometimes desirable in order to prevent generation of the gas until the oscillations produced by the shock of the opening of the parachute have subsided.

It will be noted that the cartridge 16 is provided with a vent 27 which leads to a valve 28 in a partition between the chamber for cartridge 16 and the piston 17. This valve is maintained closed so long as the pull of the load is applied to the housing 10 and the burning produced by the primer 24 is confined to the slow burning powder 26 which affords a time delay sufficient for the subsidence of the oscillations produced by the shock of the opening of the parachute. When these oscillations have subsided and the pull of the load decreases due to its contact with the earth, however, the spring 15 moves the housing 10 along the member 12 until the valve stem slips off the inner shoulder of the housing 10. This releases the valve 28, permitting gas to flow through a duct 29 into contact with the piston 17.

The piston 17 is provided with a sealing ring 30 and a rupturable coupling or shear pin 31 for ensuring it against accidental movement. At its outer end the piston 17 is provided with an extension 32 which is arranged to cooperate with a pair of latch members 33.

With the various parts in their illustrated positions, the latch members are locked against an end cap 34 of the member 12 by means of a lock pin 35 which is forced toward the piston 17 by a spring 36. When the valve 28 is opened as a result of decrease in the pull of the load, the piston 17 engages an extension 37 of the pin 35, pushing this pin against the pressure of the spring 36. At the same time, the sloping ridge 32 of the piston 17 forces the latching members 33 inwardly so that they are detached from the end cap 34 and the parachute is uncoupled from the load.

It should be noted that the spring 36 serves both to keep the members 33 interlocked with the end cap 34 and to shove the members 33 free of the end cap when the piston 17 has completed its travel.

A ridge 22 is provided on the member 35 for manual control of the connection between the device and the parachute.

The present invention thus provides a simple device whereby a gas under pressure is generated in response to the shock produced by opening of the parachute and whereby such gas is utilized to release the parachute in response to decrease in the pull of the load.

I claim:
1. The combination of first and second telescopic members each of said members having a flange which is opposed to the flange of the other member, said first member having a load connection and said second member having at its inner end a chamber enclosing an explosive cartridge and at its outer end a cylinder enclosing a piston, a partition forming a duct between said chamber and cylinder, a firing pin arranged in said partition to fire said cartridge, means for actuating said firing pin, a first rupturable coupling between said members, resilient means extending between said flanges and tending to force said second member into said first member, a sear in the partition operable to release said firing pin upon rupture of said first rupturable coupling means and compression of said resilient means to a point where the flange of said first member clears said sear, a parachute, means arranged to lock said parachute to said cylinder and to release it therefrom upon movement of said piston, a second rupturable coupling between said cylinder and said piston, and a stemmed valve mounted in said duct and operable upon extension of said resilient means to a point where the flange of said first member clears the stem of said valve to admit to said cylinder a gas generated by the firing of said cartridge whereby said piston is moved to sever said second rupturable coupling and unlock said parachute from said cylinder.

2. A combination according to claim 1 wherein said first and second rupturable couplings are shear pins.

3. A combination according to claim 1 wherein said resilient means is a helical spring.

4. A combination according to claim 1 wherein said locking means comprises a pair of hooks fixed to said parachute and extendable through an opening in said cylinder into engagement with said piston, the engaging surfaces of said piston being wedge shaped so that said hooks are engaged with said cylinder prior to rupture of said second rupturable coupling and are thereafter disengaged from said cylinder by movement of said piston toward said opening.

5. A combination according to claim 4 wherein holding means are arranged to maintain said hooks against the side of said opening, said holding means being releasable in response to movement of said piston toward said opening.

6. A combination according to claim 1 wherein said cartridge includes a slow burning element which produces a time delay between the firing of said cartridge and the opening of said valve.

References Cited in the file of this patent

UNITED STATES PATENTS 2,650,127     Garlson             Aug. 25, 1953